United States Patent
Chirhart et al.

(10) Patent No.: US 8,630,981 B1
(45) Date of Patent: Jan. 14, 2014

(54) TECHNIQUES FOR DIFFERENCING BINARY INSTALLATION PACKAGES

(75) Inventors: Gary Chirhart, Milford, MI (US); James Edwards, South Lyon, MI (US)

(73) Assignee: Symantec Corporation, Mountain View, CA (US)

( * ) Notice: Subject to any disclaimer, the term of this patent is extended or adjusted under 35 U.S.C. 154(b) by 1089 days.

(21) Appl. No.: 11/962,888

(22) Filed: Dec. 21, 2007

(51) Int. Cl.
*G06F 7/00* (2006.01)
*G06F 17/00* (2006.01)
*G06F 17/30* (2006.01)
*G06F 12/00* (2006.01)

(52) U.S. Cl.
USPC .............................. 707/625; 707/758; 707/821

(58) Field of Classification Search
USPC ............ 707/999.201, 999.203, 625, 758, 821
See application file for complete search history.

(56) References Cited

U.S. PATENT DOCUMENTS

| | | | |
|---|---|---|---|
| 5,832,520 A * | 11/1998 | Miller | 1/1 |
| 6,233,589 B1 * | 5/2001 | Balcha et al. | 1/1 |
| 6,374,250 B2 * | 4/2002 | Ajtai et al. | 1/1 |
| 6,738,789 B2 * | 5/2004 | Multer et al. | 1/1 |
| 6,925,467 B2 * | 8/2005 | Gu et al. | 707/999.001 |
| 7,568,195 B2 * | 7/2009 | Markley et al. | 717/175 |
| 2005/0132350 A1 * | 6/2005 | Markley et al. | 717/168 |
| 2005/0281469 A1 * | 12/2005 | Anderson et al. | 382/232 |
| 2006/0055951 A1 * | 3/2006 | Edmonds | 358/1.13 |
| 2006/0123032 A1 * | 6/2006 | Manapetty et al. | 707/101 |
| 2006/0161914 A1 * | 7/2006 | Morrison et al. | 717/174 |
| 2007/0079364 A1 * | 4/2007 | Abels et al. | 726/10 |

OTHER PUBLICATIONS

"MSIcode Scripting Technology for Windows Installer." InstallAware. Aug. 2007.
"InstallShield 2008." Macrovision. May 23, 2007.

* cited by examiner

*Primary Examiner* — Jeffrey A Burke

(74) *Attorney, Agent, or Firm* — Wilmer Cutler Pickering Hale and Dorr LLP

(57) ABSTRACT

Techniques for differencing binary installation packages are disclosed. In one particular exemplary embodiment, the techniques may be realized as a method for performing differencing binary installation packages. The method may comprise populating at least one data structure using information from different builds of a binary installation package, comparing information in the at least one data structure, and generating a result of the comparison.

15 Claims, 3 Drawing Sheets

TECHNIQUES FOR DIFFERENCING BINARY INSTALLATION PACKAGES

FIELD OF THE DISCLOSURE

The present disclosure relates generally to computer software and, more particularly, to techniques for differencing binary installation packages.

BACKGROUND OF THE DISCLOSURE

In current Information Technology (IT) environments, software installation is one of several routine tasks. For example, new software needs to be installed, existing software needs to be upgraded to a newer version, and defective software needs to be fixed by software patches. IT departments of various government and business entities need to deal with installation packages for all sorts of software (e.g., inspect, maintain, create, install). Software vendors need to deal with installation packages for their software products as well (e.g., create, maintain).

Differencing different versions of an installation package is desired. For example, in a typical software development environment, a binary installation package may be assembled multiple times from relevant components during development. Each assembly may be called a build. In a typical life cycle for a binary installation package, multiple builds may be generated. Each build may be different from other builds because one or more components may be modified between different builds.

A typical IT environment may keep binary installation packages in a source control system. Also, a source control system may be in a software development environment. A source control system may be a file management system that facilitates one or more users to work on one or more versions of one or more files. For example, after a binary installation package is assembled, a first developer may check out from the source control system the binary installation package, change one or more components and create a new build. If the first developer does not lock the binary installation package for exclusive modification, a second developer may check out from the source control system the same binary installation package, change one or more components and create yet another build. Each build will be different and the developers may need a utility to help identify the differences between the builds to reconcile the differences either when the builds are saved or later when deciding which build may be ready for deployment. The reconciliation may be referred to as merging.

Further, differencing different versions of an installation package is desired for IT departments that need to maintain and/or install binary installation packages. For example, an enterprise entity may have a policy to require that each binary installation package be inspected, and a list of modifications compared with a previous version of the installation package be generated before a binary installation package is deployed to target machines.

However, because each build (e.g., version) of a binary installation package may be a binary image, existing document comparison tools (e.g., WinDiff by Microsoft Corp., DeltaView by Workshare Ltd.) that may compare content of document files may not provide useful information about differences between different binary images. Further, the binary installation package may have different formats under different software specifications (e.g., Red Hat Package Manager (RPM) for a Linux operation system, Microsoft Installer (MSI) for a Windows operating system) that may make one solution to one binary format inapplicable to a different binary format.

One approach of solving the issue has been to generate a text file (e.g., XML file) for each binary image and use the existing document comparison file to compare the content of the text file. The problem with this approach is that the comparison only shows literal differences between two text files, not underlying differences between two builds of a binary installation package. Further, generated text files may lose details of the differences between two builds of a binary installation package and also increase the complexity of an installation tool. For example, an installation tool taking this approach may generate an XML file for each build. The generated XML file may not gather all information inside a build, thus may lose details of the build. Moreover, if this tool does not sort the content of the XML files in the same way on each build, differencing the XML files only shows the literal difference that may be due to the order of content, thus making it hard to find the real differences in different versions of a binary installation package.

Another approach has been to use a grid based table and perform a row by row differencing using the grid based table. For example, a Windows MSI package is a standard installation package for a Windows operating system. An existing technique of differencing two Windows MSI packages uses grid based tables. That is, a user may select a table from each MSI package and compare the tables to show differences between the two packages (e.g., a row by row comparison for additions, deletions, or modifications). However, there are many tables (e.g., File, SelfReg, Component, Directory, Feature, Feature_Component, Registry) in an MSI installation package. Properties related to entities (e.g., a file), may be scattered into many tables. Thus, the value of one property of a file (e.g., size of the file) may be stored in one table (e.g., File table), while the value of another property of the file (e.g., installation location) may be stored in another table (e.g., Directory table). Therefore, a row by row comparison of grid based tables (e.g., File table) won't show the relationship between the changes in multiple tables or the impact of a change in one table on another table, thus makes changes difficult to interpret. Further, a comparison of grid based tables will not show the nature of the differences between two versions of a binary installation package.

In view of the foregoing, it may be understood that there are significant problems and shortcomings associated with current binary installation packages differencing technologies.

SUMMARY OF THE DISCLOSURE

Techniques for differencing binary installation packages are disclosed. In one particular exemplary embodiment, the techniques may be realized as a method for performing differencing binary installation packages. The method may comprise populating at least one data structure using information from different builds of a binary installation package, comparing information in the at least one data structure, and generating a result of the comparison.

In accordance with other aspects of this particular exemplary embodiment, at least one build of the different builds of the binary installation package may be stored in a file system. The file system may be a file system of a computer operating system or a source control system.

In accordance with further aspects of this particular exemplary embodiment, populating a data structure using information from different builds of the binary installation package may further comprise opening different builds of the binary installation package and extracting information stored inside the binary installation package. Moreover, information stored inside the binary installation package may be stored in at least one data structure and the at least one data structure may be at least one table. Further, extracting information stored inside the binary installation package may further comprise invoking an application programming interface (API) to retrieve information stored in the at least one table.

In accordance with additional aspects of this particular exemplary embodiment, the data structure may comprise an entity key and a plurality of attributes. Comparing information in the data structure may further comprise matching an entity key for an entity, and comparing the plurality of attributes of the entity. Moreover, the method may further comprise presenting the generated result to an operator. The result may comprise at least one difference between the different builds of the binary installation package. The method may additionally comprise merging the at least one difference, which may comprise receiving from the operator at least one instruction to choose a desired value of an attribute.

In accordance with still further aspect of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as a system for performing differencing binary installation packages. The system may comprise: means for populating a data structure using information from different builds of a binary installation package, means for comparing information in the data structure, and means for generating a result of the comparison.

In accordance with other aspects of this particular exemplary embodiment, at least one of the different builds may be stored in a source control system. The system may be a plug in software module to the source control system.

In accordance with further aspects of this particular exemplary embodiment, the system may further comprise means for extracting information stored inside the binary installation package. The means for extracting information stored inside the binary installation package may comprise a software module for invoking an API to retrieve information stored in the binary installation package.

In accordance with additional aspects of this particular exemplary embodiment, the data structure may comprise an entity key and a plurality of attributes. The system may further comprise means for matching an entity key for an entity and means for comparing the plurality of attributes of the entity.

In accordance with still further aspects of this particular exemplary embodiment, the system may further comprise means for presenting the generated result to an operator. The generated result may comprise at least one difference between the different builds of the binary installation package. The system may additionally comprise means for merging the at least one difference. The means for merging the at least one difference may comprise means for receiving from the operator at least one instruction to choose a desired value of an attribute.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
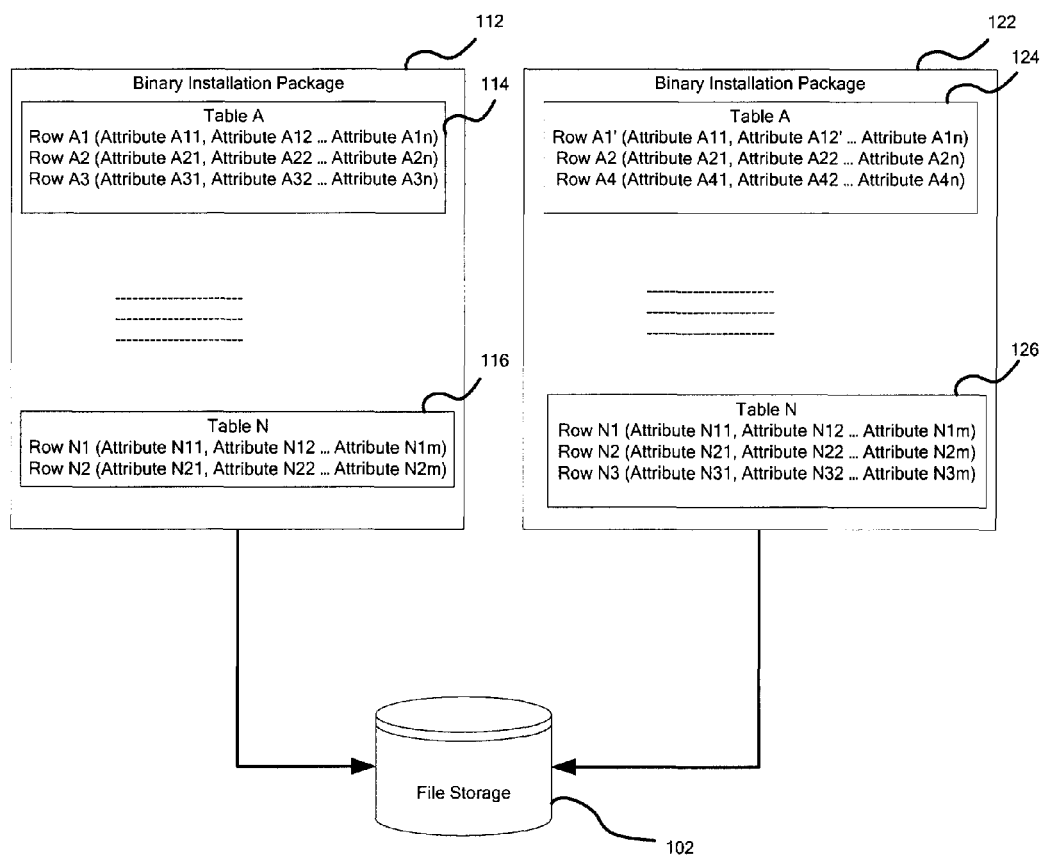
FIG. 1 shows a file system with two binary installation packages in accordance with an embodiment of the present disclosure.

Referring to FIG. 1, there is shown a file system 100 with two binary installation packages in accordance with an embodiment of the present disclosure. The file system 100 may comprise a file storage 102. The file storage 102 may comprise a first binary installation package 112 and a second binary installation package 122. The first binary installation package 112 and second binary installation package 122 may be two builds (e.g., two versions) of one installation package.

In one or more exemplary embodiments, file storage 102 may be a source control system (e.g., version control system (VCS)). The binary installation packages 112 and 122 may be binary installation packages for a computer system (e.g., Windows, Unix, Linux).

As shown in FIG. 1, the first binary installation package 112 may comprise a plurality of tables (e.g., Table A 114, Table N 116). The second binary installation package 122 may also comprise a plurality of tables (e.g., Table A 124, Table N 126). The plurality of tables in the binary installation packages 112 and 122 may be inherent in the format of the installation packages. For example, the binary installation packages 112 and 122 may be two builds of a Microsoft Installer (MSI) package. Each MSI package may comply with a specific format required by MSI package specifications. Thus, each MSI package may contain a plurality of base tables (e.g., File, SelfReg, Component, Directory, Feature, Feature_Component, Registry). For example, Table A 114 and Table A 124 may be a File table as defined in MSI package specifications, and Table N 116 and Table N 126 may be a Component table as defined in MSI package specifications. It should be noted that each of the binary installation packages 112 and 122 may comprise more than two tables. The description below about the two tables may be applicable to any other tables embedded in a binary installation package.

Each table in the binary installation packages 112 and 122 may comprise a plurality of rows and each row may comprise a plurality of attributes. For example, Table A 114 may comprise three rows Row A1, A2 and A3. And each row may comprise a plurality of attributes, such as, for example, Attribute A11, Attribute A12, and Attribute A1$n$. In one or more exemplary embodiments, each row may also comprise a unique key that uniquely identifies the row (see FIG. 2).

The first binary installation package 112 may comprise a plurality of entities (e.g., files, objects, registry keys). Each entity may have a set of attributes (e.g., size of a file, target installation location of a file) associated with it. In one or more exemplary embodiments, the set of attributes associated with an entity may be scattered into more than one base tables of the binary installation package. Thus, each row in a base table may represent a subset of features (e.g., attributes) of a specific entity in the installation package. That is, the plurality of attributes of one row in a table may comprise only a subset of features for the specific entity. For example, Table A may be a File table as defined in MSI package specifications. Each row of Table A may comprise a unique key to identify the row and some attributes of a file. Attribute A11 may be the file name. Attribute A12 may be the size of the file. Attribute A1$n$ may identify whether the file is binary (e.g., executable, image) or text (e.g., plain text, WORD document, HTML file). Like described previously, not all features of the file may be comprised in Table A. Other features of the file, for example, such as, one or more registry keys the file may require, a shortcut the file may create on a target machine, a service the file may install on the target machine, and a location where the file may be installed on the target machine, may be contained in other base tables. For example, Table N, which may be a Directory table, may contain some other features of the file (e.g., the target directory on a installed machine). Attribute N11 may be a key of a directory entry referenced to an attribute in the File table (e.g., a foreign key of a relational database), Attribute N12 may be the parent directory of the installed location, and Attribute N13 may be default directory of the installed location.

The second binary installation package 122 may be a different version (e.g., a different build) of the first binary installation package 112. As shown in FIG. 1, the second binary installation package 122 may have similar tables as the first binary installation package 112. However, the contents of each table of the second binary installation package 122 may not be identical to a corresponding table of the first binary installation package 112. For example, table A of the second binary installation package 122 may still be a File table, and similar to table A of the first binary installation package 112. However, Row A' of the second binary installation package 122 may be different from Row A of the first binary installation package 112 because the value of Attribute A12' is changed from the value of Attribute A12 (e.g., size of a file may be changed between different builds). Further, Row A3 of the first binary installation package 112 may be absent from the second binary installation package 122 because a corresponding file has been removed from the first binary installation package 112 in generating the second binary installation package 122. Moreover, Row A4 of the second binary installation package 122 may represent a new file that is included in the second binary installation package 122 but absent from the first binary installation package 112. Similarly, table N of the second binary installation package 122 still has Row N1 and N2, but also may have a Row N3 which is absent from table N of the first binary installation package 112.

The differences of the rows and attributes of the plurality of tables between the first binary installation package 112 and the second binary installation package 122 may constitute the changes between the binary installation package 112 and the binary installation package 122. Differencing the binary installation packages 112 and 122 to show changes related to one or more entities requires a thorough comparison of more than one table and more than one row in the two packages.

In one or more exemplary embodiments, a binary installation package may contain a single data structure that contains all changes to all entities embedded in the binary installation package. In these embodiments, the tables shown in FIG. 1 may be merged into the single data structure, the attributes from many rows may be merged into one or more rows. For example, in an RPM binary installation package, all features about one entity may be scattered among many rows in one data structure. Thus, in an RPM binary installation package, boundaries between table A and table N as shown in FIG. 1 are non-existent, but the attributes (e.g., features) are still scattered among many rows. Still, differencing the binary installation packages 112 and 122 to show changes related to any one entity requires a thorough comparison of more than one row of the data structure in the two packages.

Figure 2:
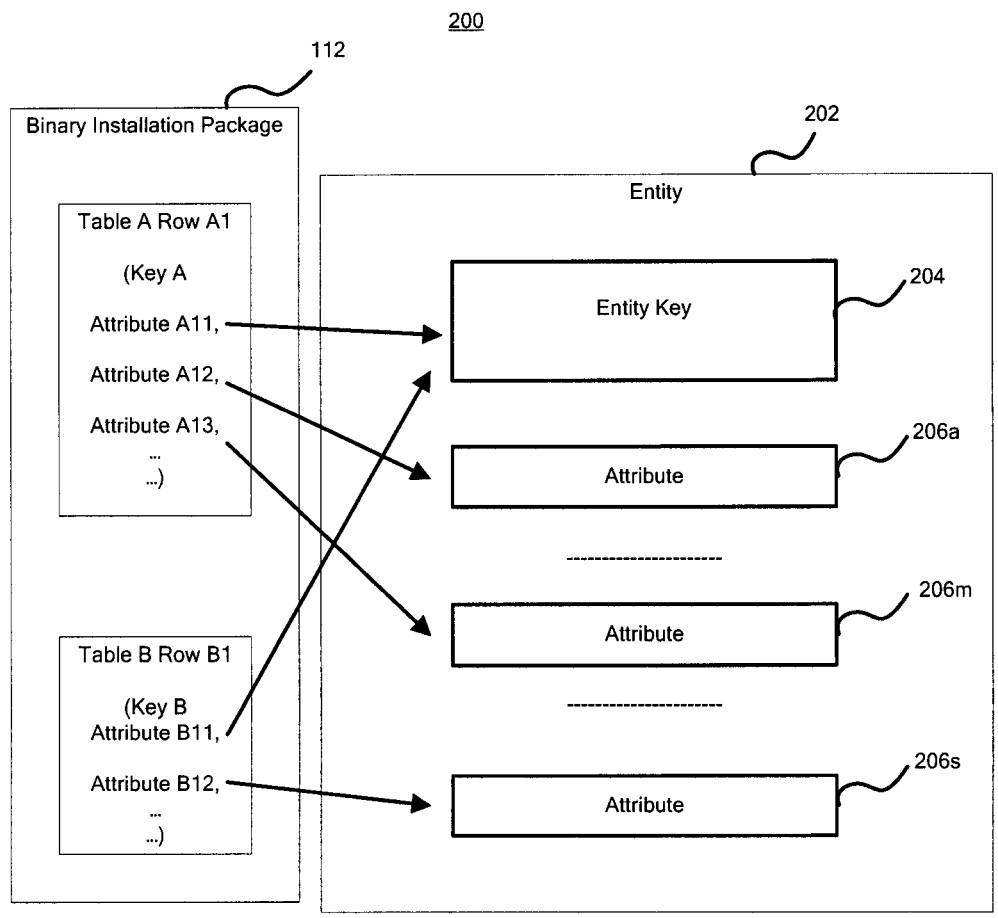
FIG. 2 shows a data structure for an entity associated with a binary installation package in accordance with an embodiment of the present disclosure.

Referring to FIG. 2, there is shown a data structure 200 associated with a binary installation package in accordance with an embodiment of the present disclosure. The data structure 200 may comprise an entity 202. The entity 202 may comprise an entity key 204 and a plurality of attributes 206, such as attribute 206$a$, attribute 206$m$, and attribute 206$s$. It should be noted that attributes 206 may be more than three and others may be omitted for simplicity.

The values for the entity key 204 and attributes 206 may be extracted from the binary installation package 112. For example, the entity 202 may represent a file. The features of the file may be extracted from the binary installation package 112. In one exemplary embodiment, the binary installation package 112 may be an MSI binary installation package. As described previously, in an MSI binary installation package, information (e.g., features) of an entity may be scattered among many tables. Table A may be a File table and row A1 may comprise some features of a file contained in the binary installation package 112. Key A of Table A may be a unique key used in the File table that uniquely identifies row A1. Attribute A11 may be a file name for the file. Attribute A12 may be size of the file. Attribute A13 may show whether the file is a binary file or text file. Table B may be another table, such as, but not limited to, a Component table. Row B1 may comprise some features of a component (e.g., a group that may be created on a target machine). Attribute B11 may be a file name of a file in a group, and Attribute B12 may be a component name (e.g., a group name). The entity 202 may be the file in the binary installation package 112. The entity key 204 of the entity 202 may be the file name, thus, entity key 204 may have the value of Attribute A11, which may have the same value as Attribute B11. Attribute 206$a$ of the entity 202 may be the size of the file, which may be a value of Attribute A12 of the binary installation package 112. Attribute 206$m$ of the entity 202 may be whether the file is a binary file or document file, which may be a value of Attribute A13 of the binary installation package 112. Attribute 206$s$ may be a component name of a component that the file belongs to, which may be a value of Attribute B12 of the binary installation package 112.

It should be noted, entity 202 may comprise all relevant features for an entity, no matter where the features are stored (e.g., one data structure for an RPM binary installation package, or a plurality of base tables for an MSI binary installation package). Thus, even though in FIG. 2 only two tables are shown in the binary installation package 112 that contribute information for the entity 202, in at least one exemplary embodiment more than two tables in the binary installation package 112 may be used to extract information for the entity 200. Further, in one or more exemplary embodiments, entity

202 may comprise information extracted from a data structure of a binary installation package (e.g., an RPM binary installation package).

In one or more exemplary embodiments, the data structure (e.g., for an RPM binary installation package) or the base tables (e.g., for an MSI binary installation package) of a binary installation package may be in a proprietary storage format. In these embodiments, a software application programming interface (API) may be provided by a software vendor. The API may provide procedures that may be called by a software module to extract information from the proprietary storage format.

In one exemplary embodiment, a software module may be implemented for a differencing operation of two binary installation packages. The software module may be plugged into a source control system. Therefore, a differencing operation may be integrated into the operation of saving any new version of a binary installation package.

During a differencing operation for two binary installation packages, a first group of data structures of the entity 202 may be created for each entity inside a first binary installation package and a second group of data structures of the entity 202 may be created for each entity inside a second binary installation package. A comparison of the first group of data structures and the second group of data structures may show the difference for each entity in the two binary installation packages. Thus, actual impact of any difference between two versions of a binary installation package on a target installation machine may be determined. For example, a software development environment may use a source code control system. A developer using an installation tool may move a dynamic link library (DLL) file from a system directory to an application directory by changing value of an attribute (e.g., Directory_entry) in a Component table that the DLL file belongs to. Later, the developer may want to verify changes made to the installation package by performing a differencing operation. Instead of showing the difference between the two versions of a binary installation package as a change in a column in the component table, one exemplary embodiment displays the file name and some text describing that a destination installation directory for the file has been changed so the developer can see the actual impact of the change.

Figure 3:
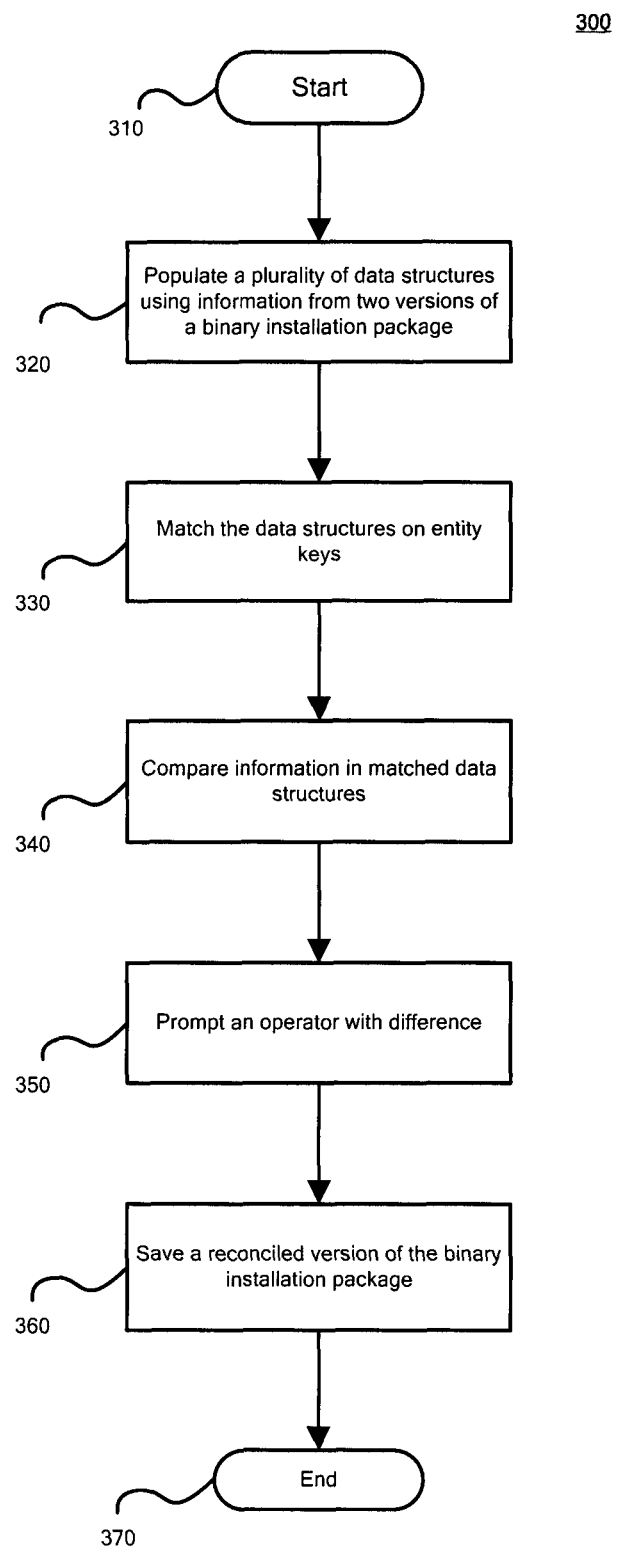
FIG. 3 shows a flow chart illustrating a process for differencing binary installation packages in accordance with an embodiment of the present disclosure.

Referring to FIG. 3, there is shown a method 300 for differencing binary installation packages in accordance with an embodiment of the present disclosure. Method 300 may start at block 310. At block 320, the method 300 may populate a plurality of data structures using information from two versions of a binary installation package. For example, a copy of the data structure of entity 202 may be created for each entity in the two versions of the binary installation package. In one exemplary embodiment, a vendor specific API may be called by a software module if the information is stored in the binary installation package in a proprietary storage format.

At block 330, the method 300 may match data structures on entity keys. The entity keys for each entity may be used to identify a unique entity. However, an entity key may be different from keys used in a table (e.g., File table, Component table) in that it may have a semantic meaning (e.g., a file name) instead of a concatenation of generated numbers and characters which may be solely for purposes as a unique key. It should be noted that one or more data structures representing one or more entities from one binary installation package may not have a matching data structure (e.g., matching entity key) of a corresponding entity from another binary installation package. That may mean the one or more entities may be absent from the other binary installation package (e.g., deletion, addition).

At block 340, the method 300 may compare information in matched data structures. At this step, the method 300 may compare data structures with matched entity keys. For example, in a software development environment using a source code control system, two installation developers may check out the same install to work on. The first developer may move a DLL file from a system directory to an application directory by changing value of an attribute (e.g., Directory_entry) in a Component table that the file belongs to. The first developer may then generate a build and save the build. The second developer may also move the file, but move it to a subdirectory of a main application directory, which may change the same attribute to a different value. Because the change is related to the same file, the entity key may be the same (e.g., same file name), thus the data structures (e.g., data structures of entity 202 from two versions of the binary installation package) may have a matching entity key value. The change may be detected by comparing the two data structures.

At block 350, the method 300 may generate display for the difference. Continuing with the example just described above, the difference may be displayed to the second developer when that developer tries to save the build that that developer just worked on. In one or more exemplary embodiments, the second developer may be presented with a choice of picking a desired value of the conflicting feature (e.g., the directory to which the first developer moved the file to or the directory to which the second developer moved the file to).

At block 360, the method 300 may save a reconciled version of the binary installation package. Further continuing the above example, the second developer may make a determination of where the file should be moved to and select an appropriate value. A reconciled version of the binary installation package may be generated and saved. At block 370, the method 300 may end.

At this point it should be noted that the technique for differencing binary installation packages in accordance with the present disclosure as described above typically involves the processing of input data and the generation of output data to some extent. This input data processing and output data generation may be implemented in hardware or software. For example, specific electronic components may be employed in a computer processor or similar or related circuitry for implementing the functions associated with file creation, transfer, deletion, or network communication in accordance with the present disclosure as described above. Alternatively, one or more processors operating in accordance with stored instructions may implement the functions associated with file creation, transfer, deletion, or network communication in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

The invention claimed is:

1. A method for differencing binary installation packages comprising:
   populating a plurality of data structures using information from different builds of a binary installation package, wherein populating the plurality of data structures comprises opening the different builds of the binary installation package, wherein at least one of the data structures comprises an entity key and a plurality of attributes;
   comparing, using a computer processor, information in the plurality of data structures, wherein comparing information in the plurality of data structures comprises:
      determining whether an entity key has been at least one of added or deleted between the different builds of the binary installation package;
      matching an entity key for an entity; and
      comparing the plurality of attributes of the entity;
   generating a result of the comparison;
   presenting the generated result to an operator, wherein the result comprises at least one difference between the different builds of the binary installation package; and
   merging the at least one difference, wherein merging the at least one difference comprises receiving from the operator at least one instruction to choose a desired value of an attribute.

2. The method according to claim 1, wherein at least one build of the different builds of the binary installation package is stored in a file system.

3. The method according to claim 2, wherein the file system is a file system of a computer operating system.

4. The method according to claim 2, wherein of the file system is a source control system.

5. The method according to claim 1, wherein information stored inside the binary installation package is stored in at least one of the plurality of data structures.

6. The method according to claim 5, wherein the at least one of the plurality of data structures is at least one table.

7. The method according to claim 6, wherein extracting information stored inside the binary installation package further comprises invoking an application programming interface (API) to retrieve information stored in the at least one table.

8. The method according to claim 1, wherein the merging of the at least one difference further comprises receiving from the operator at least one instruction to add or delete the entity key that has been determined to be at least one of added or deleted between the different builds of the installation package.

9. A system for performing differencing binary installation packages comprising:
   one or more computer processors communicatively coupled to a network, wherein the one or more computer processors are configured to:
      populate a plurality of data structure£ using information from different builds of a binary installation package, wherein populating the plurality of data structures comprises opening the different builds of the binary installation package and extracting information stored inside the binary installation package, wherein at least one of the plurality of data structures comprises an entity key and a plurality of attributes;
      compare information in the plurality of data structures, wherein comparing information in the plurality of data structures comprises:
         determining whether an entity key has been at least one of added or deleted between the different builds of the binary installation package;
         matching an entity key for an entity; and
         comparing the plurality of attributes of the entity;
      generate a result of the comparison;
      present the generated result to an operator, wherein the result comprises at least one difference between the different builds of the binary installation package; and
      merge the at least one difference, wherein merging the at least one difference comprises receiving from the operator at least one instruction to choose a desired value of an attribute.

10. The system according to claim 9 wherein at least one of the different builds is stored in a source control system.

11. The system according to claim 10, wherein the system is a plug in software module to the source control system.

12. The system according to claim 9, wherein invoking an API to retrieve information stored in the binary installation package is performed by a software module.

13. The system of claim 9, wherein the merging of the at least one difference further comprises receiving from the operator at least one instruction to add or delete the entity key that has been determined to be at least one of added or deleted between the different builds of the installation package.

14. An article of manufacture for identifying misleading applications, the article of manufacture comprising:
   at least one non-transitory computer processor readable storage medium; and
   instructions stored on the at least one medium;
   wherein the instructions are configured to be readable from the at least one medium by at least one computer processor and thereby cause the at least one computer processor to operate so as to:
      populate a plurality of data structures using information from different builds of a binary installation package, wherein populating the plurality of data structures comprises opening the different builds of the binary installation package and extracting information stored inside the binary installation package, wherein at least one of the plurality of data structures comprises an entity key and a plurality of attributes;
      compare information in the plurality of data structures, wherein comparing information in the plurality of data structures comprises:
         determining whether an entity key has been at least one of added or deleted between the different builds of the binary installation package;
         matching an entity key for an entity; and
         comparing the plurality of attributes of the entity;
      generate a result of the comparison;
      present the generated result to an operator, wherein the result comprises at least one difference between the different builds of the binary installation package; and
      merge the at least one difference, wherein merging the at least one difference comprises receiving from the operator at least one instruction to choose a desired value of an attribute.

15. The article of manufacture according to claim 14, wherein the merging of the at least one difference further comprises receiving from the operator at least one instruction to add or delete the entity key that has been determined to be at least one of added or deleted between the different builds of the installation package.

* * * * *